(12) United States Patent
Stueve et al.

(10) Patent No.: US 9,347,827 B2
(45) Date of Patent: May 24, 2016

(54) SYSTEM FOR FIELD MEASUREMENT AND CALIBRATION OF PHOTOVOLTAIC REFERENCE DEVICES

(71) Applicant: Atonometrics, Inc., Austin, TX (US)

(72) Inventors: William Stueve, Austin, TX (US);
Michael Gostein, Austin, TX (US);
Lawrence R. Dunn, Austin, TX (US);
Stan Faullin, Ausitn, TX (US)

(73) Assignee: Atonometrics, Inc., Austin, TX (US)

( * ) Notice: Subject to any disclaimer, the term of this patent is extended or adjusted under 35 U.S.C. 154(b) by 0 days.

(21) Appl. No.: 14/114,118

(22) PCT Filed: Apr. 18, 2013

(86) PCT No.: PCT/US2013/037120
§ 371 (c)(1),
(2) Date: Oct. 25, 2013

(87) PCT Pub. No.: WO2013/158847
PCT Pub. Date: Oct. 24, 2013

(65) Prior Publication Data
US 2015/0308889 A1    Oct. 29, 2015

Related U.S. Application Data

(60) Provisional application No. 61/635,314, filed on Apr. 19, 2012, provisional application No. 61/728,898, filed on Nov. 21, 2012.

(51) Int. Cl.
*G01J 1/18* (2006.01)
*H02S 50/10* (2014.01)
(Continued)

(52) U.S. Cl.
CPC ............... *G01J 1/18* (2013.01); *G01J 1/0252* (2013.01); *G01J 1/32* (2013.01); *H02S 50/10* (2014.12); *G01J 1/0242* (2013.01); *G01J 1/0403* (2013.01); *G01J 1/0488* (2013.01); *G01J 2001/4266* (2013.01)

(58) Field of Classification Search
CPC ............ G01J 1/32; G01J 1/18; G01J 1/0252; G01J 1/0403; G01J 1/0242; G01J 1/0488; G01J 2001/4266; H02S 50/10
See application file for complete search history.

(56) References Cited

U.S. PATENT DOCUMENTS

| 4,371,738 A * | 2/1983 | Staebler | ............ H01L 31/03767 136/243 |
| 2005/0052172 A1 * | 3/2005 | Schripsema | ............... G05F 1/67 323/284 |

(Continued)

FOREIGN PATENT DOCUMENTS

| JP | 2012054554 | 3/2012 |
| JP | 2012054554 A | 3/2012 |

(Continued)

*Primary Examiner* — Patrick Assouad
*Assistant Examiner* — Haidong Zhang

(57) ABSTRACT

A system for field measurement and calibration of photovoltaic reference devices, including a reference device electronics unit that measures the electrical output of a photovoltaic reference module and provides data to determine the solar irradiance received by the reference module as a function of its electrical output; and a calibrator unit that is used to routinely recalibrate the reference device electronics unit and the reference module, wherein the calibrator unit contains one or more calibrated photovoltaic reference cell(s).

115 Claims, 6 Drawing Sheets

(51) Int. Cl.
*G01J 1/32* (2006.01)
*G01J 1/04* (2006.01)
*G01J 1/02* (2006.01)
*G01J 1/42* (2006.01)

(56) References Cited

U.S. PATENT DOCUMENTS

| | | |
|---|---|---|
| 2006/0290344 A1 | 12/2006 | Shimotomai et al. |
| 2009/0218983 A1 | 9/2009 | Loudot |
| 2010/0307479 A1* | 12/2010 | Park .......................... F24J 2/38 126/601 |
| 2011/0067750 A1* | 3/2011 | Ueda ......................... F24J 2/38 136/246 |
| 2011/0270546 A1* | 11/2011 | Smith ..................... H02S 50/10 702/60 |
| 2012/0173031 A1* | 7/2012 | Parameswaran .......... H02J 7/35 700/295 |
| 2012/0193512 A1* | 8/2012 | Wu ............................ F24J 2/38 250/203.4 |

FOREIGN PATENT DOCUMENTS

| | | |
|---|---|---|
| WO | 2009134660 | 11/2009 |
| WO | 2009134660 A2 | 11/2009 |
| WO | 2010042533 | 4/2010 |
| WO | 2010042533 A2 | 4/2010 |
| WO | 2010078303 | 7/2010 |
| WO | 2010078303 A2 | 7/2010 |

\* cited by examiner

SYSTEM FOR FIELD MEASUREMENT AND CALIBRATION OF PHOTOVOLTAIC REFERENCE DEVICES

RELATED APPLICATION DATA

The present application claims priority to U.S. Provisional Patent Application Ser. No. 61/635,314 filed Apr. 19, 2012; and U.S. Provisional Patent Application Ser. No. 61/728,898 filed Nov. 21, 2012, which are incorporated herein by reference.

FIELD OF THE INVENTION

The invention relates to a system for field measurement and calibration of photovoltaic (PV) reference devices used for monitoring performance of solar power plants.

BACKGROUND OF THE INVENTION

Photovoltaic (PV) modules, also known as solar panels, are used in solar power installations for converting sunlight to electricity. Such installations range from small rooftop systems on residential or commercial buildings to large utility-scale facilities including hundreds of thousands or millions of PV modules. Collectively, we refer to these as "solar power plants."

Frequently solar power plants employ performance monitoring systems to monitor and compare output power to expectations, allowing fault conditions or underperforming equipment to be identified and repaired, especially in large commercial or utility-scale facilities. Since the instantaneous electrical output of solar power plants is related to the incident solar irradiance, such performance monitoring systems include reference devices to measure the incident solar irradiance. Large solar power plants may include many reference devices in order to monitor irradiance in different sections of the plant as well as to provide measurement redundancy. Frequently reference device data on solar irradiance are integrated over time to yield solar insolation, the energy received per unit area over a given time period, also referred to as irradiation.

Several types of reference devices are in use for measurement of solar irradiance in a solar power plant.

One of the most widely used reference devices is the thermopile pyranometer. This device measures the temperature rise of an absorbing disk exposed to the incident solar irradiance. Pyranometers have a very uniform spectral response over the majority of the solar spectrum, and therefore provide a good measure of total incident solar radiation without regard to spectral variations. However, because of this and other factors, pyranometer measurements do not correlate perfectly with the output of a PV solar power plant. PV devices are sensitive to typical solar spectral variations. Such variations are caused by seasonal, geographic, and man-made atmospheric effects. The effect of typical solar spectral variations on the discrepancy between pyranometers and PV devices may be on the order of several percent. Furthermore, pyranometers and PV devices may show additional discrepancies due to differences in angular response, temperature coefficients, module soiling, and other parameters.

Another widely used reference device is the PV reference cell. This device functions by measuring the short-circuit current from a single PV cell encapsulated in a package, which typically contains a temperature sensor allowing the cell reading to be temperature corrected. Reference cells are typically calibrated in laboratory conditions where spectral response, linearity, and temperature coefficients may be precisely characterized. In contrast to pyranometers, which are spectrally insensitive and measure total radiation, reference cells are spectrally sensitive and measure the effective irradiance or usable irradiance available to the PV device. Reference cell readings therefore correlate very well with the electrical output of PV modules constructed from the same or similar PV technology, since PV modules are made from a group of PV cells in series and/or parallel combination.

However, PV reference cell devices are not widely available in all PV technologies for the purpose of matching to a particular PV module type. PV reference cells are typically fabricated using crystalline silicon PV devices. Their spectral response may vary from that of thin film PV devices such as those made from, e.g., cadmium telluride (CdTe) or copper indium gallium diselenide (CIGS), or even from that of specialized crystalline silicon PV devices fabricated using different methods. Large differences in spectral response between the reference cell and the PV modules to be monitored can be reduced by adding a filter to the reference cell that adjusts its spectral response to more closely match that of a particular PV module type.

Another approach is to use a designated PV reference module as the reference device. In this case, the reference module may be chosen to be identical in technology and construction to the power-producing modules used in the solar power plant, and its spectral response and temperature coefficients will be the same as those of the monitored modules. The reference module is calibrated to determine its output as a function of incident solar irradiance. Like a reference cell, a reference module measures the usable solar irradiance received by the PV device, rather than the total irradiance. Use of a reference module has several potential advantages: the reference module may be selected directly from the same manufacturing line used to produce the monitored modules; the spectral and angular responses are exactly the same as the monitored modules; and the reference modules are constructed to withstand outdoor conditions for many years yet are typically available at lower cost than reference cells due to high volume manufacturing.

However, several practical difficulties arise with the use of reference modules.

The typical measurement approach for a reference cell or reference module is to hold the device near short circuit and measure current through a shunt resistance. Under these conditions, reference modules may degrade faster than reference cells, since at short-circuit lower-performing cells within a module may be forced into reverse bias by higher-performing cells and therefore dissipate power and generate heat, leading to degradation and/or eventual failure.

Furthermore, the linearity of reference module output with respect to light intensity may be inferior to that of a reference cell due to parasitic shunt and series resistances.

Furthermore, laboratory-based calibration and periodic recalibrations are considerably more expensive for reference modules than for reference cells, due to the larger size of reference modules and associated greater costs of removing them from service, shipping them to and from laboratories, and replacing them into service, as well as the greater risk of stress or damage to reference modules during handling and shipping due to their larger size and more complicated construction.

In view of the above shortcomings of existing methods for using PV reference modules to monitor field-installed PV modules in a solar power plant, there is a need for an improved system to measure and calibrate PV reference modules.

BRIEF SUMMARY OF THE INVENTION

The disclosed subject matter provides a system for field measurement and calibration of PV reference devices. Objects of the disclosed subject matter include providing a system that permits conversion of any PV module into a reference module 104; minimizing short-circuit induced degradation of the reference module 104 and other changes in performance that result from specific electrical bias conditions; facilitating calibration and recalibration of the reference module 104 in the field; and facilitating calibrations of reference modules 104 at a range of outdoor conditions corresponding to actual operating ranges of light intensity and temperature rather than only at laboratory conditions.

Although discussed in connection with a system for the field measurement and calibration of PV reference "modules," it will be apparent that the system of the disclosed subject matter could equally be used for the measurement and calibration of field-installed PV reference cells, with similar benefits, since these are essentially modules with a single cell. Accordingly, throughout the text, reference modules 104 may be understood to include reference cells wherever appropriate.

The system comprises one or more reference device electronics units (RDE) 110 each of which connects to a reference module 104 and measures its short-circuit current at periodic intervals, and a portable calibrator unit 112 which connects to the reference device electronics units 110 for initial and periodic recalibrations of the reference device electronics units 110 and the reference module 104. In one embodiment, the reference device electronics units 110 and the calibrator unit 112 are used together as a system. In another embodiment, the reference device electronics units 110 are used without the calibrator unit 112, while in yet another embodiment, the calibrator unit 112 is used without the reference device electronics units 110.

These and other aspects of the disclosed subject matter, as well as additional novel features, will be apparent from the description provided herein. The intent of this summary is not to be a comprehensive description of the subject matter, but rather to provide an overview of some of the subject matter's functionality. Other systems, methods, features and advantages here provided will become apparent to one with skill in the art upon examination of the following FIGUREs and detailed description. It is intended that all such additional systems, methods, features and advantages that are included within this description be within the scope of the accompanying claims.

BRIEF DESCRIPTIONS OF THE DRAWINGS

The novel features believed characteristic of the disclosed subject matter will be set forth in the accompanying claims. The disclosed subject matter itself, however, as well as a preferred mode of use, further objectives, and advantages thereof, will best be understood by reference to the following detailed description of illustrative embodiments when read in conjunction with the accompanying drawings, wherein:

In the figures, like elements should be understood to represent like elements, even though reference labels may be omitted on some instances of a repeated element for simplicity.

DETAILED DESCRIPTION OF ILLUSTRATIVE EMBODIMENTS

Although described with particular reference to a system for field measurement and calibration of PV reference modules 104, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

Overview

Figure 1A:
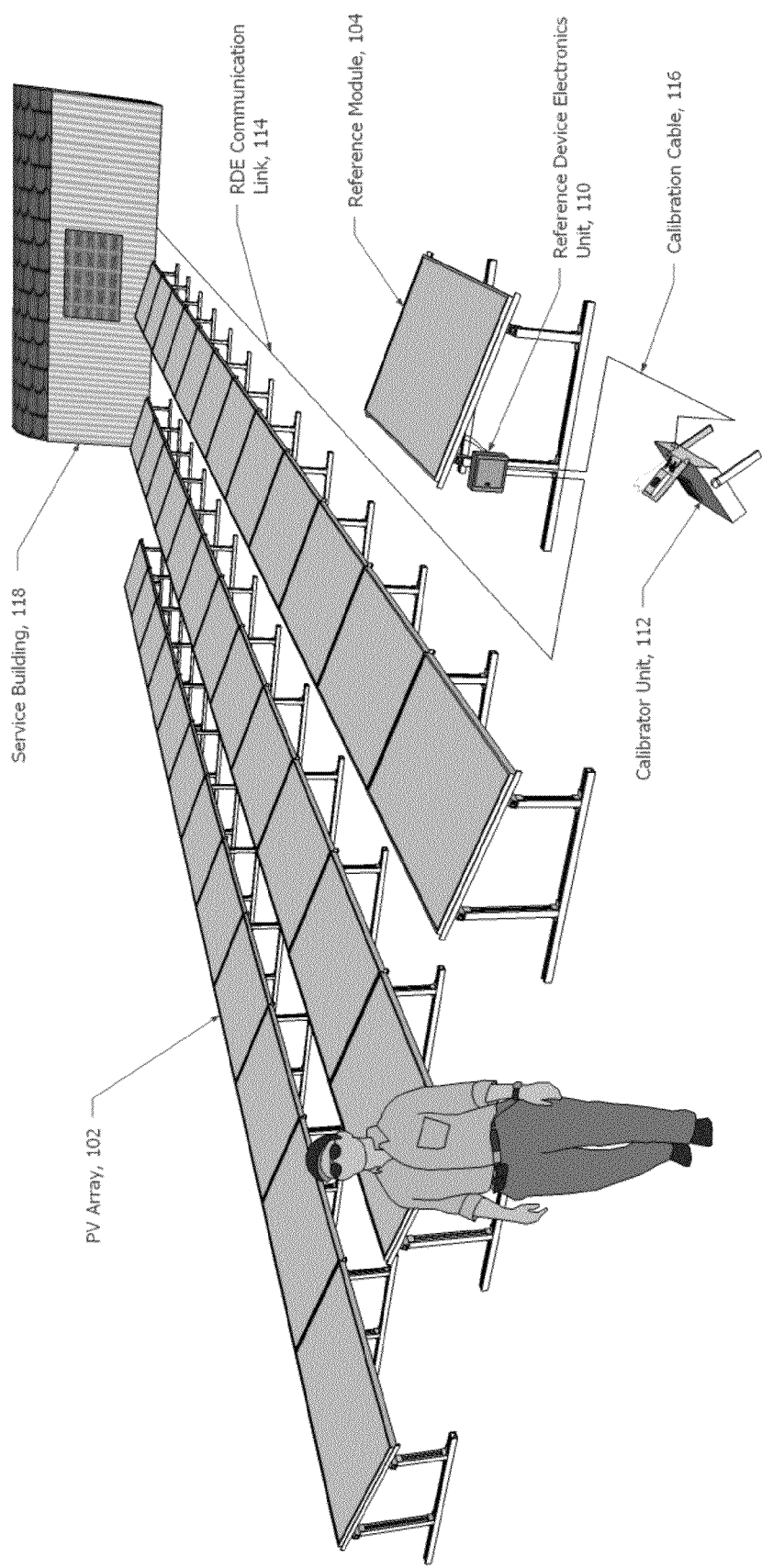
FIG. 1a depicts an overview of a system according to the disclosed subject matter.
Figure 1B:
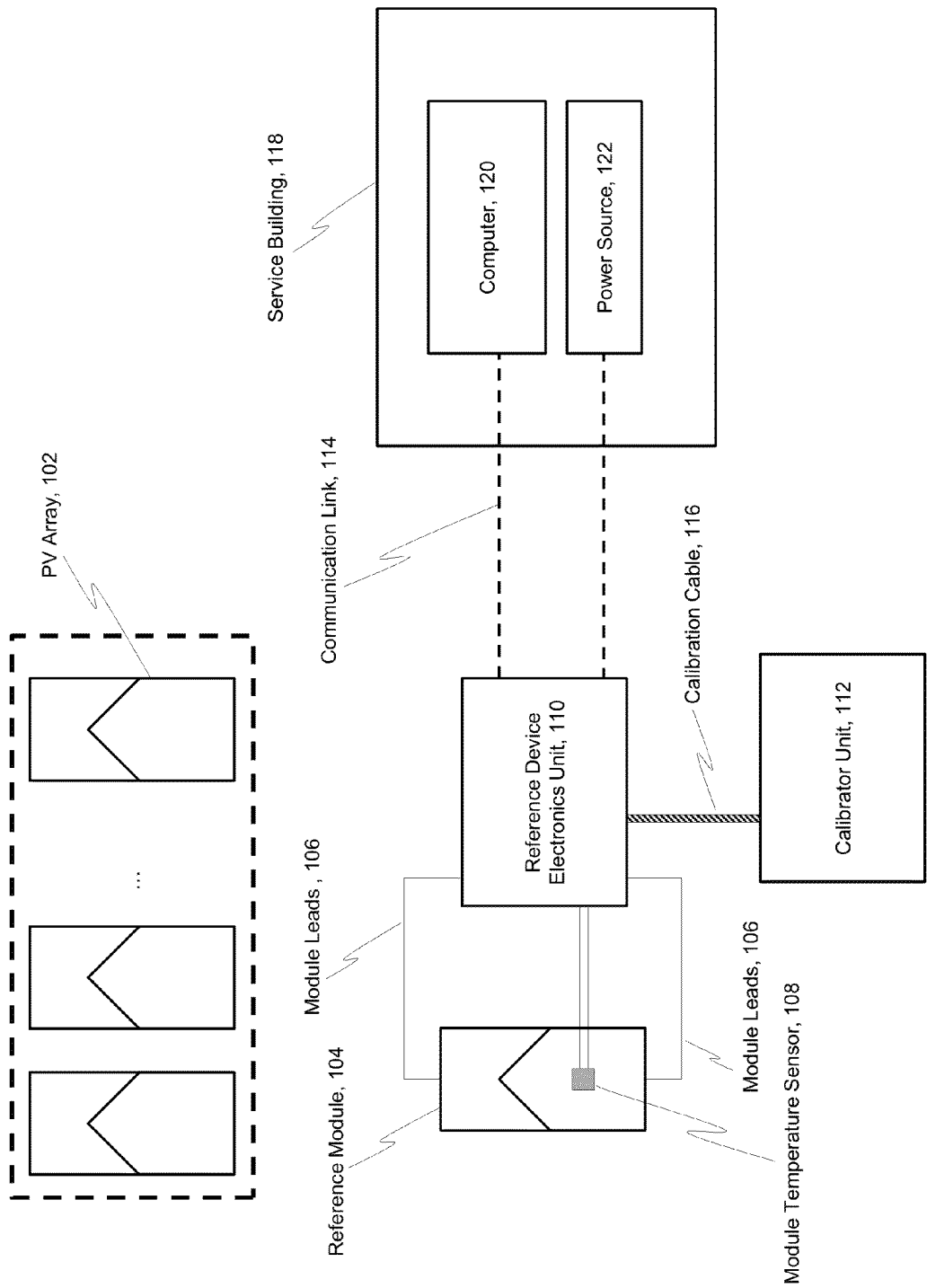
FIG. 1b depicts an overview of a system according to the disclosed subject matter, in a schematic form.

FIG. 1a and FIG. 1b depict an overview of a system according to the disclosed subject matter. A solar power plant is depicted by a plurality of PV modules comprising a PV array 102, together with other equipment not shown. A PV reference module 104 is installed substantially near or within the PV array 102. The module leads 106 of the reference module 104 are connected to the reference device electronics unit 110, which is located substantially near the reference module 104. In one embodiment, a module temperature sensor 108 is attached to the reference module 104 and connected to the reference device electronics unit 110. The reference device electronics unit 110 is connected via the communication link 114 to a computer 120 or other computing or data acquisition system, which may be located, for example, in a service building 118 that is part of a solar power plant. A power source 122 which may be located in the service building 118 powers the reference device electronics unit 110.

The reference device electronics unit 110 periodically measures the short-circuit current of the reference module 104 and optionally its temperature via the module temperature sensor 108, if present. The reference device electronics unit 110 may then calculate solar irradiance using the measured data together with internally stored calibration data. Results are reported via the communication link 114.

In one embodiment, the communication link 114 comprises a wired connection, while in another embodiment it comprises a wireless link.

In one embodiment, the reference device electronics unit 110 is not continuously connected to the computer 120, but rather logs measurement data in internal memory for later transfer or retrieval.

In one embodiment, the power source 122 comprises a dedicated solar panel located outdoors near the reference device electronics unit 110. In another embodiment, the reference device electronics unit 110 is powered directly by the reference module 104 in between measurements.

In one embodiment, at routine intervals a calibrator unit 112 is brought to the site and connected to the reference device electronics unit 110 to calibrate both the reference device electronics unit 110 and the reference module 104. The calibrator unit 112 is connected to the reference device electronics unit 110 via the calibration cable 116; the calibrations are performed; and the calibrator unit 112 is then disconnected.

Reference Device Electronics

Overview

Figure 2:
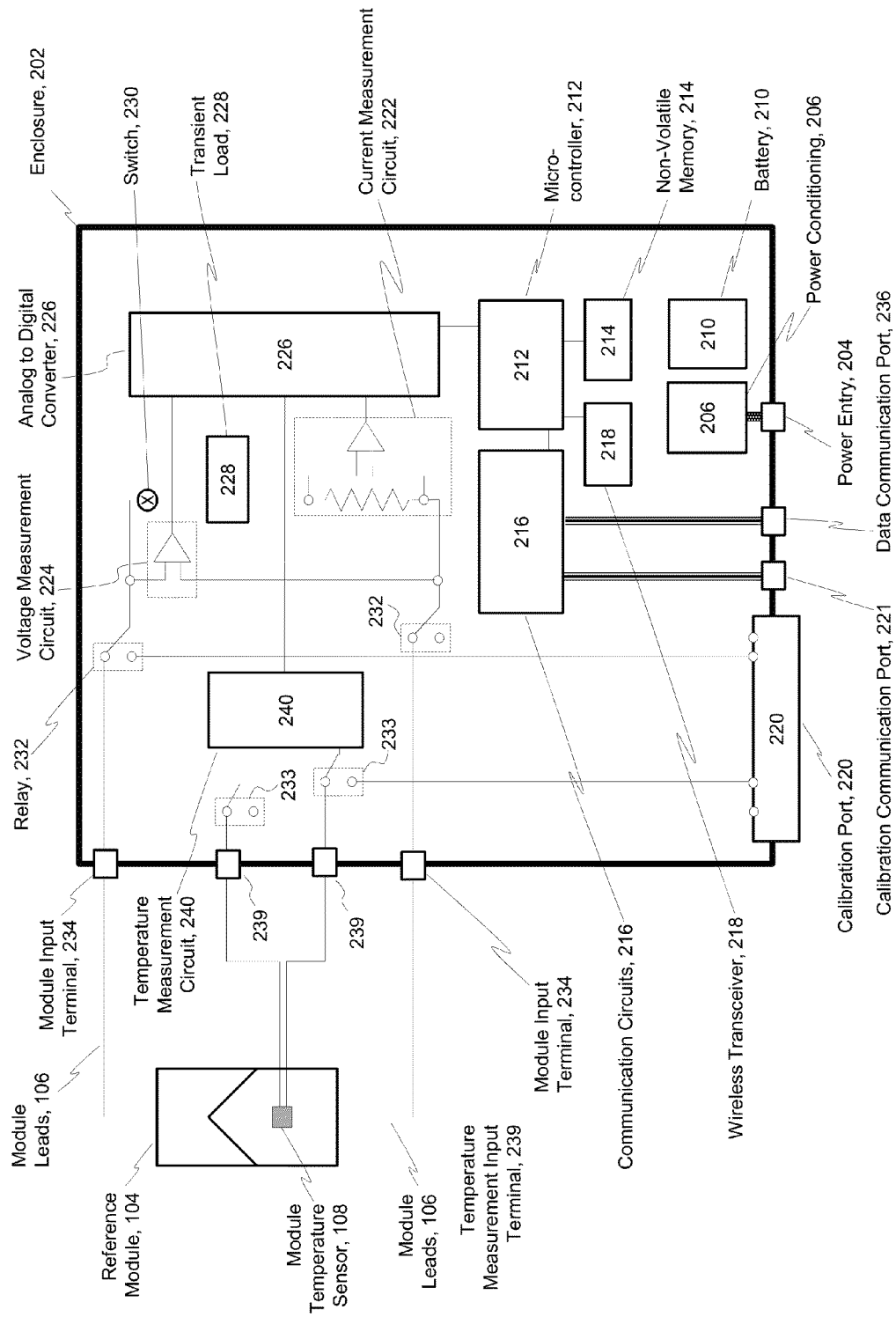
FIG. 2 depicts a block diagram of an embodiment of the reference device electronics unit 110.

FIG. 2 depicts a block diagram of an embodiment of the reference device electronics unit 110.

The module leads 106 of the reference module 104 connect to the reference device electronics unit 110 via its module input terminals 234. The current flowing through the reference module 104 is measured using the current measurement circuit 222. Optionally, the reference module 104 voltage is also measured using the voltage measurement circuit 224. An optional switch 230 is used to allow or interrupt the flow of current from the reference module 104. An optional transient load 228 may be used to alter the current flowing in the circuit in order measure the current versus voltage relationship of the reference module 104.

The current measurement circuit 222 is implemented so as to have negligible series resistance and therefore negligible voltage drop at module currents which are typically in the range from 1 to 15 amps. For example, the circuit may consist of a shunt resistor with resistance in the milliohm range and an instrumentation amplifier to scale the voltage drop across the sense resistor to a measureable level. Preferably, the voltage drop across the current measurement circuit 222 is less than 3%, or even less than 1%, of the reference module 104 open-circuit voltage, which is typically in the range from 15 to 100 volts, to provide for the most accurate measurement of short-circuit current and to comply with requirements of International Electrotechnical Commission standard 60904-2.

In one embodiment, the switch 230 and the transient load 228 are omitted, causing the reference module 104 to be held continuously at its short-circuit condition due to the connection of the current measurement circuit 222 directly across the module input terminals 234.

In another embodiment, the switch 230 is used to open and close the circuit, so that the reference module 104 is held in either the open-circuit or short-circuit condition. The switch 230 may comprise, for example, a relay or a transistor device.

The switch 230, transient load 228, and current measurement circuit 222 may be combined in an alternate order from that shown in FIG. 2.

The outputs of the current measurement circuit 222 and the optional voltage measurement circuit 224 are digitized by an analog-to-digital converter 226.

Biasing

In one embodiment, a biasing power supply (not shown) is used to permit a reverse bias voltage to be applied in series with the reference module 104. This allows compensation for voltage drops occurring within the current measurement circuit 222, the module leads 106, and the module input terminals 234, permitting measurements to be performed closer to the ideal short-circuit condition in which the voltage drop across the reference module 104 is identically zero. In one embodiment, the biasing power supply voltage is automatically adjusted via a feedback circuit to continuously maintain the voltage drop across the reference module 104 at the short-circuit condition. In a special case of this embodiment, the reference module 104 comprises a reference cell. In another embodiment, the biasing power supply voltage may be adjusted to measure the reference module 104 in a reverse-bias condition.

In another embodiment, another biasing power supply (not shown) is used to permit a forward bias voltage to be placed in series with the reference module 104. This allows measurement of the reference module at voltages higher than its open-circuit voltage, or measurement of current versus voltage relationships of the reference module 104 in the dark.

Controller

The reference device electronics unit 110 is controlled by, for example, a microcontroller 212. The microcontroller 212 interfaces with the analog-to-digital converter 226. The microcontroller 212 may store data and/or program instructions in non-volatile memory 214. Communication circuits 216 allow the microcontroller 212 to send and receive data and instructions via a data communication port 236 which enables the communication link 114. In another embodiment the microcontroller 212 uses a wireless transceiver 218 to send and receive data and the communication link 114 is wireless.

Module Temperature Measurement

In one embodiment the temperature of the reference module 104 is measured using a module temperature sensor 108, which is connected to the reference device electronics unit 110 via input terminals 239 and measured using a temperature measurement circuit 240. The module temperature sensor 108 may comprise, for example, a thermocouple or an RTD (resistance temperature detector).

In another embodiment, the temperature of the reference module 104 is measured by the reference device electronics unit 110 by opening the switch 230 to place the reference module 104 into an open-circuit condition, measuring the open-circuit voltage of the reference module 104, and calculating an equivalent temperature corresponding to the open-circuit voltage. This avoids the need for a temperature sensor 108.

Data

In one embodiment, the reference device electronics unit 110 measures and reports the reference module 104 short-circuit current and temperature to a remote computer 120 which calculates solar irradiance from the measured data using calibration data stored on the computer 120 or within the reference device electronics unit 110. In another embodiment, the calculation of solar irradiance is performed within the reference device electronics unit 110 and the result is then communicated to the computer 120. In another embodiment, the reference device electronics unit 110 stores data internally for later transmission and retrieval and the remote computer 120 is unnecessary.

Recalibration

At routine intervals the reference device electronics unit 110 may be recalibrated.

In one embodiment the reference device electronics unit 110 contains relays 232 and/or 233 which facilitate recalibration without disconnection of the module leads 106 or the temperature sensor 108 from the reference device electronics unit 110. Relays 232 normally pass the output of the module leads 106 to the measurement circuits (222, 224) and associated circuitry. Likewise relays 233 normally pass the signal from the module temperature sensor 108 to the temperature measurement circuit 240. For calibration, the relays (232 and/or 233) are switched into an alternate position that connects the current, voltage, and temperature measurement circuits (222, 224, 240) to a calibration port 220 (or, in another embodiment, to one or more calibration ports serving different functions). When the calibration port 220 is connected to the calibration unit 112, this permits calibration of the measurement circuits (222, 224, 240).

In another embodiment, relays 232 and/or 233 are omitted, terminals 234 and/or 239 are wired directly to their respective measurement circuits, and the module leads 106 and/or temperature sensor 108 must be temporarily disconnected from the reference device electronics unit in order to allow connection of measurement leads from the calibration unit 112.

In one embodiment, calibration data are transferred using the data communication port 236. In another embodiment, calibration data are transferred using a dedicated calibration communication port 221. In another embodiment, calibration data are transferred wirelessly using a wireless transceiver 218.

Enclosure & Mounting

In one embodiment the reference device electronics unit 110 is contained within a weather-tight enclosure 202 designed to be mounted outdoors in close proximity to the reference module 104. In one embodiment, the enclosure 202 is mounted close enough to the reference module 104 that the module leads 106 may connect directly to the module input terminals 234 without extension cables, in order to minimize voltage drops along the cabling. In one embodiment, the enclosure 202 is mounted on racking underneath the reference module 104. In another embodiment, the enclosure is mounted directly to the underside of the reference module 104, e.g. on its frame or on or within its junction box.

Power

The reference device electronics unit 110 receives electrical power from the external power source 122 at its power entry connection 204. A power conditioning circuit 206 produces necessary voltages and currents. An optional battery 210 managed by the power conditioning circuit 206 may be included to permit intermittent unpowered operation.

In one embodiment, the reference device electronics unit 110 is powered by a dedicated solar panel, or, in an alternate embodiment, by its connected reference module 104.

I-V Measurements

In one embodiment, the reference device electronics unit 110 may measure the current versus voltage relationship ("I-V curve") of the reference module 104. An optional transient load 228 is included that allows the reference module 104 current to be swept from short-circuit to open-circuit or vice-versa, during which time the I-V curve is measured and stored. Functions of the switch 230 and the transient load 228 may be combined, for example by using a transistor device. Optionally, if biasing power supplies (not shown) are included in the reference device electronics unit 110, the I-V curve may also include points at which the reference module 104 is forward and/or reverse-biased. The I-V curve sweep time must be sufficiently short to prevent excessive heating of the transient load 228 during the I-V sweep (due to received power from the reference module 104, which may be in the range from 20 to 500 W); sufficiently short to minimize the impact of irradiance changes during the sweep; and sufficiently long to allow accurate measurement. Sweep times on the order of 1 second or shorter would typically meet these requirements.

In one embodiment, the transient load 228 is implemented using a transistor device as a variable impedance. A control voltage or current is applied to adjust the transistor from a high-impedance state to a low impedance state, or vice-versa, during which time the I-V curve may be measured. In one embodiment, the transistor control signal is adjusted via a feedback circuit in order to maintain the instantaneous voltage or current at the module input terminals 234 at a programmed value. In one embodiment, the programmed value is swept through a range of values to implement the I-V sweep.

Measurement of the reference module 104 I-V curve enables several beneficial features. Various fault conditions of the reference module 104 may be identified from the I-V curve, allowing the reference device electronics unit 110 to issue an alert. For example, degradation of the reference module 104 may be detected by observation of a change in the I-V curve fill factor (the ratio of maximum power to the product of short-circuit current and open-circuit voltage). Furthermore, analysis of the I-V curve may be used to detect soiling of the reference module 104 in certain conditions, such as soiling of an individual cell or a section of the reference module 104, and therefore indicate that cleaning is necessary.

In one embodiment, the transient load 228 may be replaced or supplemented by a steady-state programmable load (not shown), allowing the reference device electronics unit 110 to continuously maintain the reference module 104 at any point along the I-V curve, including the maximum power point. In this case the steady-state programmable load must be capable of continuously dissipating any power received from the reference module 104, which may be in the range from 20 to 500 W. The reference device electronics unit 110 may programmatically adjust the operating point to maintain the reference module 104 in the desired condition, e.g. maximum power output, fixed current, etc. This capability allows the reference module 104 to be held, in between irradiance measurements, at electrical conditions that minimize degradation of the reference module 104, or, alternatively, at conditions that match the degradation to that of the modules to be monitored in the PV array 102. Optionally, if biasing power supplies (not shown) are included in the reference device electronics unit 110, the reference module 104 may be continuously maintained at a forward and/or reverse bias condition when the reference module 104 is illuminated and/or when it is in the dark.

Calibrator Unit

Overview

Figure 3:
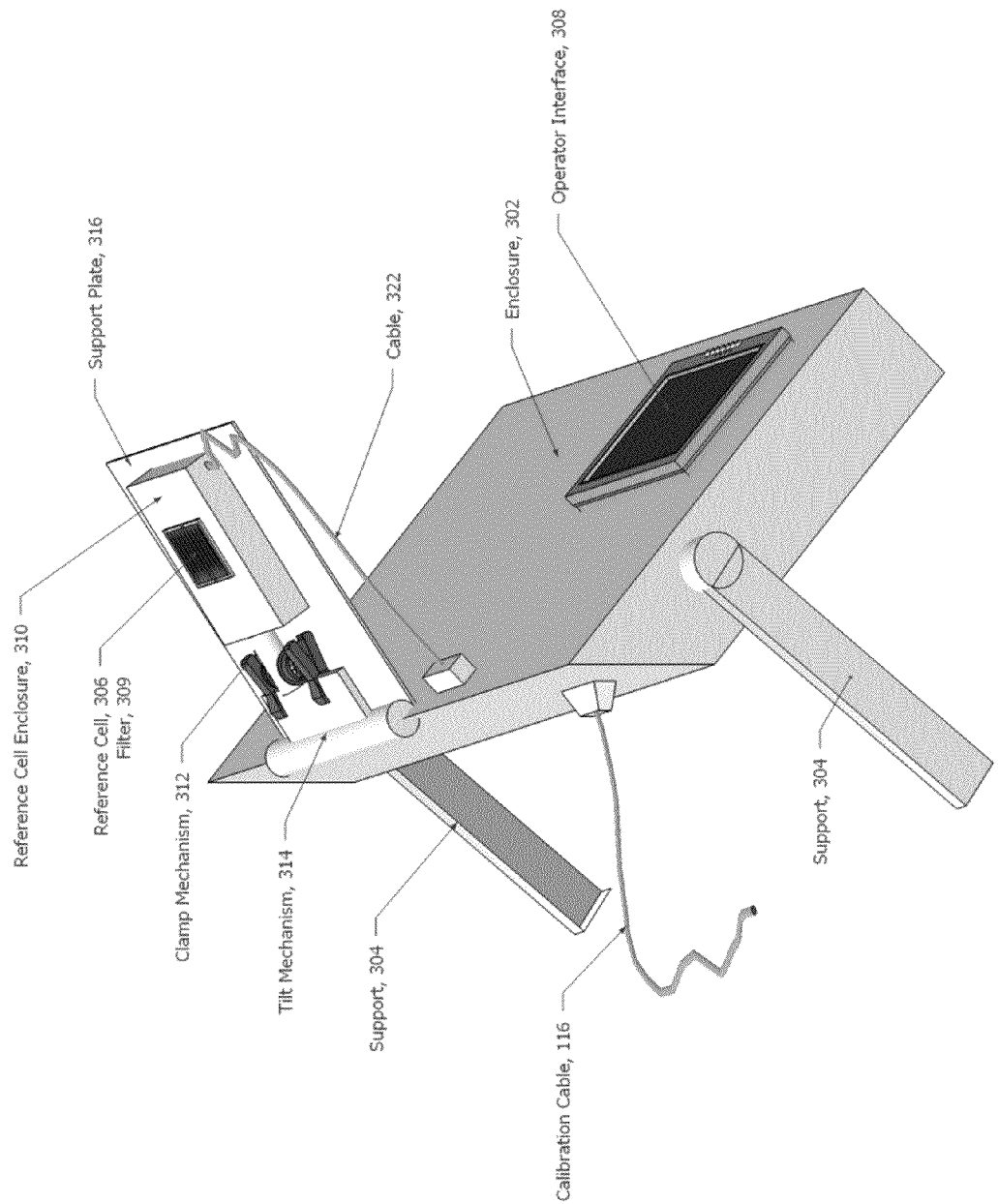
FIG. 3 depicts an embodiment of the calibrator unit 112.

FIG. 3 depicts an embodiment of the calibrator unit 112. Functions of the calibrator unit 112 include providing a highly accurate measurement of solar irradiance for calibration of the reference module 104; measuring the short-circuit current and/or the complete I-V curve of the reference module 104; and calibrating the current, voltage, and/or temperature measurement circuits (222, 224, 240) of the reference device electronics unit 110.

The calibrator unit 112 is designed to be portable. A single calibrator unit 112 may be used to calibrate multiple pairs of reference modules 104 and reference device electronics units 110 on a single site or on multiple sites. For calibration, an operator positions the calibrator unit 112 in a suitable location near the reference module 104 where the solar irradiance striking the reference module 104 can be measured.

The calibrator unit 112 is contained within an enclosure 302 and is provided with an operator interface 308. The operator interface 308 may comprise, for example, a touch-screen display, buttons, indicators, and/or other interface elements. In one embodiment, the operator interface 308 is integrated within the enclosure 302, while in an alternate embodiment, the operator interface 308 and optionally other components reside in a separate enclosure (not shown).

Irradiance Measurement

The calibrator unit 112 measures solar irradiance using a highly calibrated PV reference cell 306. In one embodiment, the spectral response of the reference cell 306 is modified using a filter 309, in order to reduce the spectral response mismatch between the reference cell 306 and the reference module 104, and the reference cell is calibrated together with the filter 309 prior to use.

For calibration of the reference module 104, the solar irradiance measured at the plane of the reference cell 306 must be related to the solar irradiance received at the plane of the reference module 104. Two methods may be used to achieve this. In one method, the plane of the reference cell 306 is positioned to be substantially parallel to the plane of the reference module 104, such that both devices receive substantially the same solar irradiance. In another method, the reading of the reference cell 306 is corrected to determine the solar irradiance of the reference module 104 by accounting for the angles between each of these devices and the incident solar irradiance.

In one embodiment, the reference cell 306 is incorporated within a reference cell enclosure 310, together with the filter 309 and electronic components needed to measure the reference cell 306 output.

In one embodiment, the reference cell enclosure 310 is mechanically separate from the main calibrator unit enclosure 302, as depicted in FIG. 3. The reference cell enclosure 310 may be electrically connected to the calibrator unit enclosure 302 with a cable 322 or it may be battery-powered and communicate wirelessly.

In one embodiment, a clamp mechanism 312 or bracket (not shown) or other suitable mechanical element allows removing the reference cell enclosure 310 and attaching it to the reference module 104 or its frame or supporting structure in such a way that the reference cell 306 is substantially parallel to the plane of the reference module 104 or such that the relative angle between the reference cell 306 and the reference module 104 is well-defined.

In one embodiment, the calibrator unit 112 facilitates positioning of the reference cell 306 substantially parallel to the plane of the reference module 104 with or without attachment to the reference module 104, by providing an adjustable mounting location for the reference cell enclosure 310 on the calibrator unit 112, as depicted in FIG. 3. In this embodiment, the enclosure 302 includes a mechanism allowing the angular orientation of the reference cell enclosure 310 to be adjusted. For example, this may include supports 304, allowing the inclination of the enclosure 302 to be adjusted; a support plate 316, which supports the reference cell enclosure 310; and a tilt mechanism 314, which allows the inclination and/or azimuthal angle of the support plate 316 to be adjusted. By proper orientation of the enclosure 302 and use of the aforementioned adjustments, the reference cell 306 may be positioned to be substantially parallel to the reference module 104, without attachment to the reference module 104.

Figure 4:
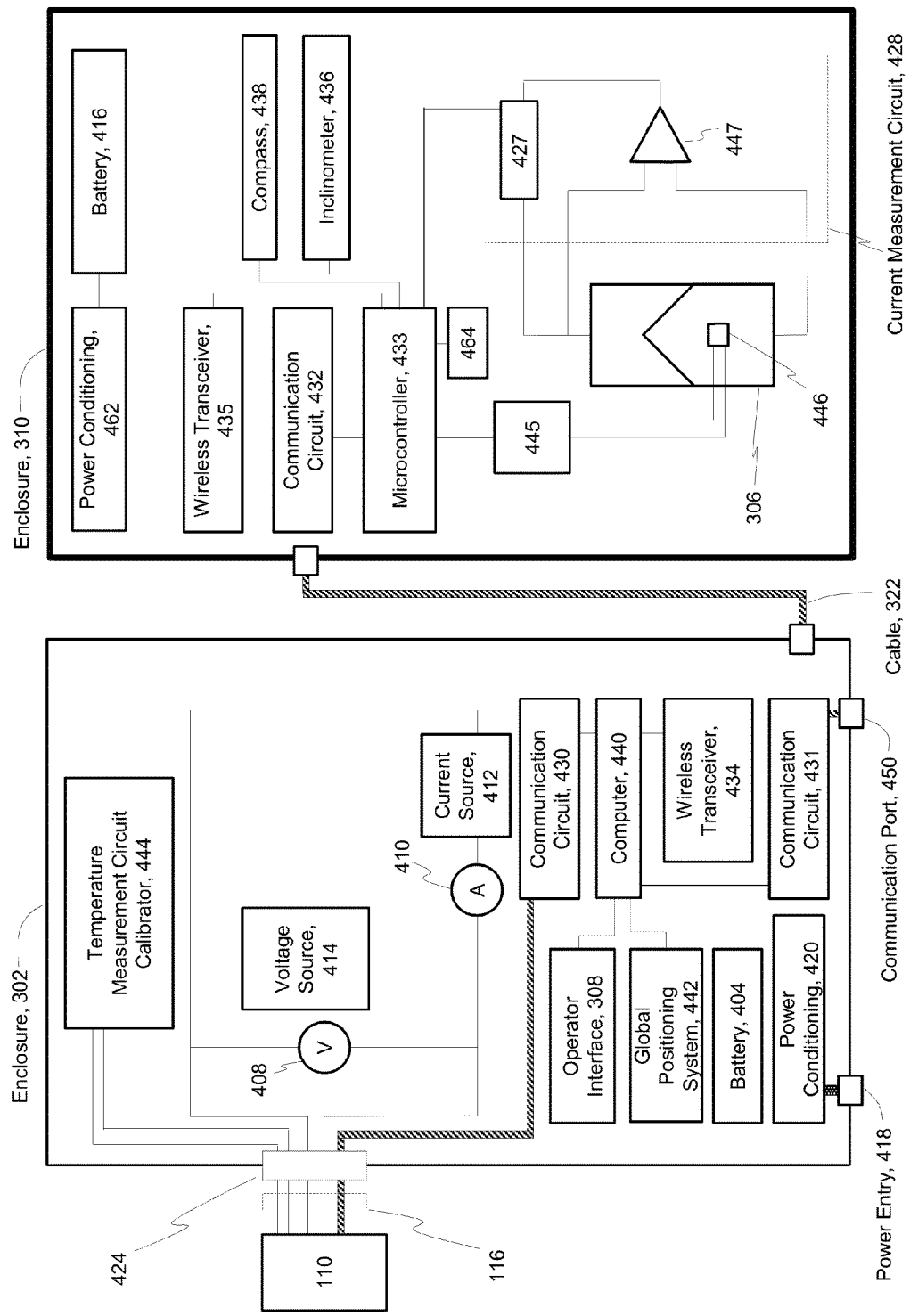
FIG. 4 depicts a block diagram of an embodiment of the calibrator unit 112.

In one embodiment depicted in FIG. 4, which depicts a block diagram of the calibrator unit 112, the reference cell enclosure 310 contains an inclinometer 436 and/or a compass 438, permitting angular orientation of the reference cell 306 to be determined. In one embodiment, sensing of this angular orientation is used to determine when the reference cell 306 is substantially co-planar with the reference module 104, provided that the angular orientation of the reference module 104 is known. In another embodiment, sensing of this angular orientation is used to correct the reading of the reference cell 306 to determine the solar irradiance in the plane of the reference module 104, provided that the angular orientation of the reference module 104 is known. Calibration of the reference cell 306 itself may include calibration as a function of angle of incidence, and these calibration data may be used to increase the accuracy of the calculation of solar irradiance at the reference module 104 as a function of the relative angular orientations of the reference module 104 and the reference cell 306.

Reference Module Calibration

For calibration of the reference module 104, in one embodiment the reference module 104 is connected to the calibrator unit 112 via the module leads 106 and the precision current and voltage measurement circuits (412, 414) are used to measure the short-circuit current and/or complete I-V curve of the reference module 104. This may be achieved by using the voltage source 414 and/or current source 412, optionally using a feedback circuit, to hold the reference module 104 in a short circuit condition or to sweep through a range of voltages allowing measurement of the I-V curve.

In an alternate embodiment, the reference module 104 is calibrated by first using the calibrator unit 112 to calibrate the reference device electronics unit 110 and subsequently using the reference device electronics unit 110 to perform calibration measurements of the reference module 104.

Interface

Continuing with FIG. 4, in one embodiment the main enclosure 302 contains a computer 440 or other computing device and an operator interface 308. In an alternate embodiment, enclosure 302 contains primarily measurement electronics functions while the operator interface 308 and optionally the computer 440 and other elements reside in a separate enclosure (not shown). For example, in one embodiment, functions of the operator interface 308, computer 440, and global positioning system 442 may be implemented using a battery-powered handheld tablet computing device which communicates with the other components of the measurement system through a wired or wireless connection. This embodiment may be advantageous in providing more freedom to the operator and simplifying engineering of the system. In one embodiment, the handheld tablet computing device also contains a camera, which may be used, for example, to capture images of bar codes representing serial numbers on relevant elements, including the reference module 104, the reference device electronics unit 110, and other elements. Although described with reference to a handheld tablet computing device, alternative devices could also be employed such as smart phones, laptops, notebooks, and other mobile devices.

Power and Communication

In one embodiment the calibrator unit 112 is powered by a battery 404. Main power or charging power is provided at a power entry port 418 and such power is conditioned by a power conditioning circuit 420. The calibrator unit 112 may communicate with other devices via a communication circuit 431 and a communication port 450, using any of a number of standards, e.g. USB, Ethernet, etc. Alternatively the unit may communicate via a wireless transceiver 434.

Reference Device Electronics Calibration

For calibration of the reference device electronics unit 110 current, voltage, and temperature measurement circuits (222, 224, 240), the calibrator unit 112 is connected to the reference device electronics unit 110 via the calibration cable 116. A current source 412 within the calibrator unit 112 provides a current which is measured by a precision current measurement circuit 410 within the calibrator unit 112 as well as by the current measurement circuit 222 within the reference device electronics unit 110, allowing the current measurement circuit 222 to be calibrated with respect to precision current measurement circuit 410. Similarly, in one embodiment, a voltage source 414 within the calibrator unit generates a voltage which is measured by a precision voltage measurement circuit 408 and by the voltage measurement circuit 224 within the reference device electronics unit 110, allowing the voltage measurement circuit 224 to be calibrated with respect to precision voltage measurement circuit 408. Similarly, in one embodiment, a temperature measurement circuit calibrator 444 provides a voltage, current, or other electrical signal allowing the temperature measurement circuit 240 to be calibrated. The current source 412, voltage source 414, and temperature measurement circuit calibrator 444 operate under the control of the computer 440.

The computer 440 communicates with the reference device electronics unit 110 using a communication circuit 430 via the calibration cable 116, or alternatively via a wireless transceiver 434, or alternatively via other communication circuits and/or ports. The computer 440 transfers data and calibration results between the calibrator unit 112 and the reference device electronics unit 110 and controls the state of the reference device electronics unit 110 as required in order to perform the calibration. For example, the computer 440 controls the position of the relays (232, 233) in the reference device electronics unit 110, if present, in order to calibrate the measurement circuits.

Reference Cell

In one embodiment, the reference cell 306 of the calibrator unit 112 is contained within a separate reference cell enclosure 310 as depicted in FIG. 4. The reference cell enclosure 310 may be connected to the main enclosure 302 via a cable 322 which provides power and/or communication signals. In one embodiment, the reference cell enclosure 310 contains only passive devices and signals are passed in analog form. In another embodiment, the reference cell enclosure 310 may contain a power conditioning circuit 462, an optional battery 416, a microcontroller 433 or other controlling device, and optional non-volatile memory 464. In this embodiment, for communication with the computer 440 the reference cell enclosure 310 may contain a communication circuit 432 and/or an optional wireless transceiver 435.

Within the calibrator unit 112, the reference cell 306 is maintained in a short-circuit condition by a feedback circuit 447 (which may be located either within the reference cell enclosure 310 as depicted or, alternatively, within enclosure 302) and its short-circuit current is measured by a precision current measurement circuit 427. The solar irradiance corresponding to the reference cell short-circuit current may be calculated using calibration data stored, for example, within non-volatile memory 464.

The temperature of the reference cell may be measured using a temperature sensor 446, which may comprise, for example, a thermocouple or RTD affixed to the back side of the reference cell 306, together with a temperature measurement circuit 445. In another embodiment, the temperature of the cell may be measured indirectly by measuring the open-circuit voltage of the reference cell 306 or of another reference cell (not shown) immediately adjacent and substantially parallel to the reference cell 306. The measured temperature of the reference cell may be used to correct the calculation of solar irradiance from the reference cell 306 short-circuit current using temperature coefficient calibration data stored, for example, within the non-volatile memory 464.

In one embodiment, the temperature of the reference cell 306 is controlled or stabilized by incorporation of a heating element (not shown) and/or cooling element (not shown), in order to provide for higher accuracy measurements.

As discussed earlier in connection with FIG. 3, in one embodiment the reference cell enclosure contains an inclinometer 436 and/or a compass 438 which permit determination of the angular orientation of the reference cell enclosure 310.

In one embodiment, the reference cell enclosure 310 is incorporated within the enclosure 302 and is not removed for normal operation, but may be removed for maintenance or periodic laboratory recalibration. In another embodiment, the reference cell 306 and all other elements that would otherwise be incorporated within the reference cell enclosure 310 in any embodiment are instead contained directly within the main enclosure 302.

In one embodiment, the calibrator unit 112 includes multiple reference device enclosures 310, each of which has a filter 309 matching a different PV technology. In one embodiment, one of several reference device enclosure 310 options, each of which has a different type of reference cell 306 and/or filter 309, may be selected by a user and connected to the calibrator unit 112.

In one embodiment, the calibrator unit 112 uses a second externally connected reference module (not shown) as a reference device to calibrate the reference module 104 connected to the reference device electronics unit 110, in lieu of a reference cell 306.

Global Positioning System

In one embodiment, the calibrator unit 112 contains a global positioning system 442 allowing the location of the calibrator unit 112 to be determined. Location data may be used to facilitate retrieval of site-specific configuration or calibration data, to log site location data to a database for later identification of data, or to enable calculation of expected solar angles of incidence or other parameters.

Recalibration

The calibrator unit 112 requires periodic recalibration. In one embodiment, the entire calibrator unit 112 is returned to the manufacturer or to a calibration laboratory at routine intervals for recalibration. In another embodiment, only the reference cell enclosure 310 and/or another sub-enclosure (not shown) containing precision current and voltage measurement circuits (410, 408) are returned for recalibration, minimizing shipping costs.

Reference Module Calibration Process

In one embodiment, site-specific data are recorded during or prior to the installation of the reference module 104, and these data are either stored in memory within the calibrator unit 112 or made available through a network resource that the calibrator unit 112 may access during field use. Site-specific data may include the locations, types, and serial numbers of reference modules 104 present on the site; the angular orientation of the reference modules 104; and/or the configuration of tracking mechanisms used to adjust the angular orientations of the reference modules 104 during the day, if such are present.

In an exemplary embodiment, the process of calibrating an installed reference module 104 proceeds according to the following steps: an operator brings the calibrator unit 112 to the site of the reference module 104; the operator enters identification data for the reference module 104, the reference device electronics unit 110, and other relevant elements into the calibrator unit 112, optionally using a barcode scanning device or camera integrated with the calibrator unit 112; the operator positions the reference cell enclosure 310 such that the reference cell 306 can measure the incident solar irradiance in the plane of array of the reference module 104; the operator disconnects the reference device electronics unit 110 from the reference module 104 and connects it to the calibrator unit 112; the calibrator unit 112 performs a calibration of the current and voltage measurement circuits (222, 224) and transfers calibration data to the reference device electronics unit 110 for storage in non-volatile memory; the operator disconnects the calibrator unit 112 from the reference device electronics unit 110 and connects it to the reference module 104; the calibrator unit 112 measures either the short-circuit current or the I-V curve of the reference module 104 substantially simultaneously with measurement of the irradiance and calculates calibration constants for the reference module 104; the calibrator unit 112 transfers calibration data for the reference module 104 to the reference device electronics unit 110 for storage in non-volatile memory; the operator disconnects the reference module 104 from the calibrator unit 112 and reconnects the reference module 104 to the reference device electronics unit 110; the operator removes the calibrator unit 112 or takes it to another location within the site.

In another exemplary embodiment, the process of calibrating an installed reference module 104 proceeds according to the following steps: an operator brings the calibrator unit 112 to the site of the reference module 104; the calibrator unit 112 determines its location using a global positioning system 442; the calibrator unit 112 accesses stored data on site-specific information; the calibrator unit 112 presents the operator with a list of reference modules 104 matching its location and the operator then selects or confirms the reference module 104 to be calibrated; the operator positions the calibrator unit 112 and/or reference cell enclosure 310 such that the reference cell 306 can measure the incident solar irradiance; the operator connects the calibrator unit 112 to the reference device electronics unit 110 via a cable 116; the calibrator unit 112 causes the reference device electronics unit 110 to disconnect the reference module 104 from the current and voltage measurement circuits (222, 224), performs a calibration of these circuits, and then causes the reference device electronics unit 110 to reconnect to the reference module 104; the operator adjusts the position and orientation of the calibrator unit 112 and/or the reference cell enclosure 310 until the calibrator unit signals via the operator interface 308 that it has detected that the angular orientation of the reference cell 306 is sufficiently coplanar with the reference module 104; the calibrator unit 112 measures the solar irradiance received at the reference cell 306 substantially simultaneously with the short-circuit current and temperature of the reference module 104, via the reference device electronics unit 110; the calibrator unit 112 corrects the reading of solar irradiance for any substantial difference in angular orientation between the reference cell 306 and the reference module 104; the calibrator unit 112 causes the measured calibration data for the reference module 104 to be stored within non-volatile memory 214 of the reference device electronics unit 110; the operator disconnects the calibrator unit 112 from the reference device electronics unit 110 and removes the calibrator unit 112 or takes it to another location within the site.

Calibration Matrix

PV reference devices are typically calibrated to Standard Test Conditions ("STC") which correspond to 25° C. device operating temperature and an incident irradiance of 1000 W/m$^2$ (matched to the AM1.5 reference solar spectrum defined, for example, in International Electrotechnical Commission standard 60904-3). STC provides a convenient basis for laboratory calibration; however, it does not correspond to normal PV module operating conditions. PV modules typically reach temperatures of 50° C. or higher during normal operation outdoors.

The effect of temperature on a PV module's performance is usually accounted for by determining temperature coefficients of the module's electrical parameters. For typical PV modules the short-circuit current temperature coefficient may be on the order of 0.05% per ° C. Therefore, the short-circuit current may vary by 1% or more between STC and typical operating conditions. However, temperature coefficients are typically only known to within 50% relative uncertainty. Therefore, the solar irradiance measured using a reference module 104 calibrated at STC but operated at 50° C. or higher may have an uncertainty contribution of +/−0.5% or greater due to the temperature difference.

Other differences between STC and actual operating conditions may also contribute uncertainty to solar irradiance measurements with reference modules 104. For example, while STC calibration is done at a single light intensity, reference module 104 output may not be strictly proportional to light intensity due to the effects of internal series and/or shunt resistances.

It is an object of the disclosed subject matter to minimize uncertainty contributions from these sources by permitting calibration of reference modules 104 at actual operating conditions.

Figure 5:
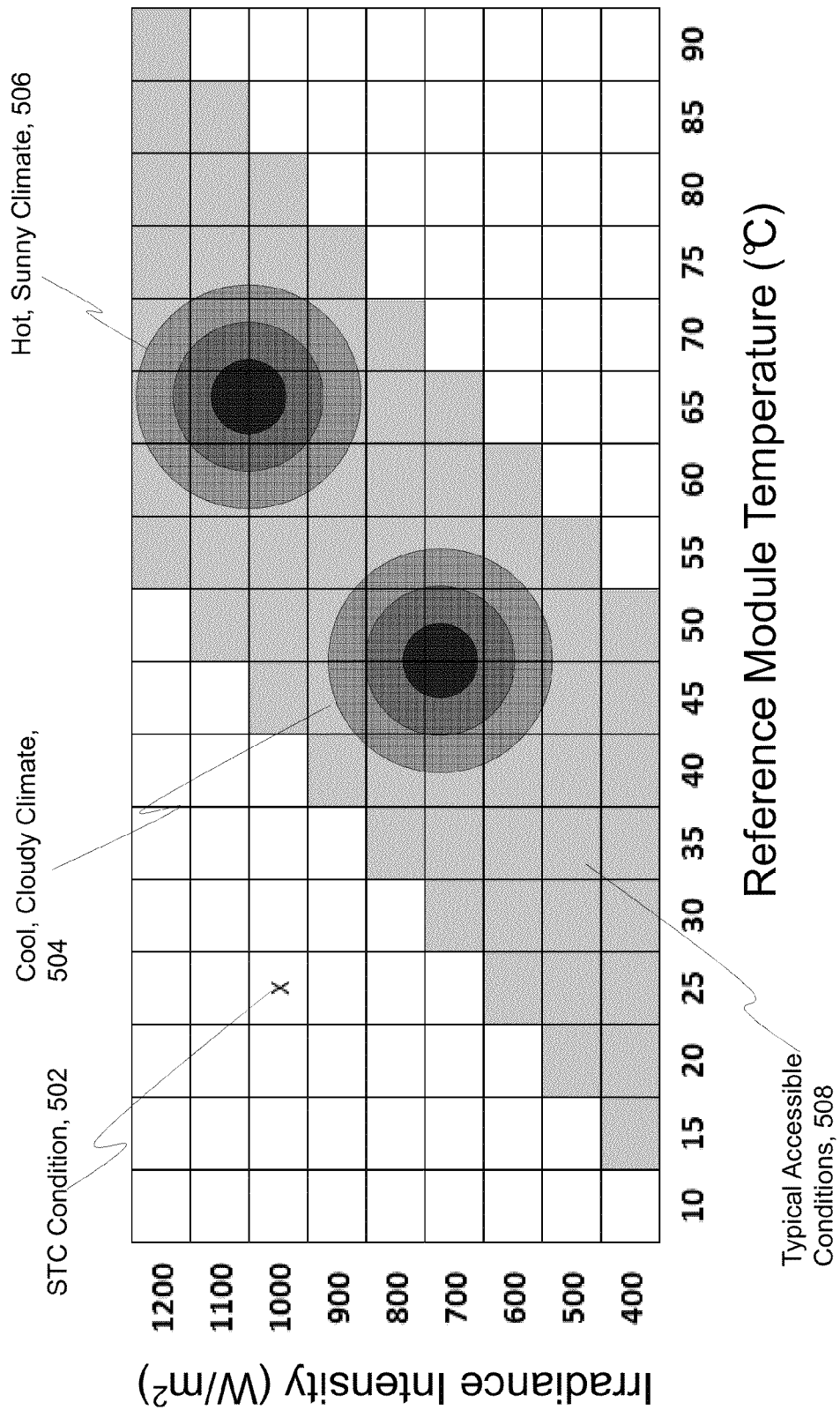
FIG. 5 depicts a matrix of irradiance and temperature conditions for reference module 104 calibrations.

FIG. 5 depicts a matrix of potential calibration and measurement conditions. The STC condition 502 is indicated. An example range of typical accessible conditions 508 is indicated in gray shading. The reference module 104 temperature will generally increase with irradiance intensity but will also depend on ambient temperature and wind speed. The chart indicates examples of typical conditions corresponding to a cool cloudy climate 504 (or winter months) and to a hot sunny climate 506 (or summer months).

In one embodiment, the system is used to calibrate the reference module 104 at a typical outdoor operating condition of temperature and irradiance, and these data together with stored and/or measured data on the reference module 104 temperature coefficients are used to calculate irradiance at all other operating conditions. In another embodiment, the system is used to calibrate the reference module 104 at multiple outdoor operating conditions; the calibration results corresponding to each of these conditions are stored; and the data are used to determine irradiance at all other operating conditions through e.g. interpolation, extrapolation, or fitting. For example, the system may be used to calibrate the reference module 104 once during winter and once during summer, or once in the morning and once in the afternoon of a single day, etc., and the resulting data may be used to determine calibration coefficients of the reference module 104, including temperature coefficients. In another embodiment, the reference module 104 may be calibrated at conditions close to STC 502 by temporarily shading or otherwise cooling the reference module 104 prior to measurement on a bright sunny day. In one embodiment, interpolation of measured reference module data 104 is performed using methods outlined in International Electrotechnical Commission standard 60891.

Calibration of the reference module 104 at one or more typical operating conditions may increase the accuracy of the solar irradiance measurements made with the reference module 104. The ability of the system to facilitate these measurements is an advantage of the disclosed subject matter.

Reference Module Stabilization

For use as a reference device, the electrical output of the reference module 104 for given conditions of irradiance and temperature should be highly stable. However, for some PV technologies, especially thin film PV, the electrical output of the PV module may change significantly following manufacturing during an initial period of light exposure that may last tens to hundreds of hours before the output stabilizes. Therefore, the reference module 104 may require stabilization.

In one embodiment, the reference module 104 is stabilized by a period of light exposure ("light soaking") prior to being placed into service. In another embodiment, the reference module 104 is allowed to stabilize in the field after installation, and, in another embodiment, the calibrator unit 112 is used to measure the reference module 104 at routine intervals and determine, manually or automatically, when stabilization is complete.

Remote Data Storage and Analysis

In one embodiment, data recorded by the calibrator unit 112 are uploaded to a remote computer (not shown) for archival and/or data analysis. In one embodiment, analysis of calibration data is performed exclusively on the remote computer, and the calibrator unit 112 is used exclusively for data collection.

Conclusion

Although example diagrams to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. A system for field measurement and calibration of photovoltaic (PV) reference devices, wherein said PV reference devices are PV cells or PV modules, comprising:
   one or more outdoor-mounted reference device electronics (RDE) units, each of which performs measurements on an associated PV reference device; and
   a portable calibrator unit, which calibrates the each of one or more RDE units and each of one or more RDE units associated PV reference devices;
   wherein each of the one or more RDE unit comprises:
      a weather-resistant mounting enclosure;
      terminals connecting with its associated PV reference device, the associated PV reverence device being either a PV cell or PV module;
      a current measurement circuit to measure the current of the associated PV reference device;
      control and communications circuitry; and
         non-volatile memory which stores:
         a first calibration data for the RDE unit;
         a second calibration data for its associated PV reference device; and
         measurement data
   wherein each of the one or more RDE units contains a biasing power source with adjustable voltage in series with the current measurement circuit;
   wherein the biasing power source may be automatically adjusted via a feedback mechanism to maintain the voltage across each of the one or more RDE units associated PV reference device near zero volts, constituting an ideal short-circuit condition.

2. The system of claim 1, wherein each of the one or more RDE units measures the short-circuit current and temperature of its associated PV reference device and calculates irradiance from the short-circuit current and temperature measured values and calibrated against at least one of: the first calibration data, and the second calibration data.

3. The system of claim 1, wherein each of the one or more RDE units contains a switching element allowing its associated PV reference device to be maintained in either a short-circuit or open-circuit condition between measurements.

4. The system of claim 1, wherein each of the one or more RDE units contains a transient or adjustable load and a voltage measurement circuit to measure the voltage of its associated PV reference device, which together with the current measurement circuit permit measurement of a current versus voltage relationship ("I-V curve") of its associated PV reference device.

5. The system of claim 4, wherein the I-V curve is used to detect degradation or soiling of each of the one or more RDE units associated PV reference device.

6. The system of claim 1, wherein each of the one or more RDE units contains dedicated calibration terminals to facilitate connection of the calibrator unit without disconnection of its associated PV reference device, and wherein each of the one or more RDE units contains relays or other switching elements allowing the dedicated calibration terminals to be connected to the internal measurement circuitry of each of the one or more RDE units.

7. The system of claim 3, wherein each of the one or more RDE units further comprises a voltage measurement circuit to measure the voltage of its associated PV reference device and each of the one or more RDE units measures the temperature of its associated PV reference device by measuring the associated PV reference device's voltage in the open-circuit condition.

8. The system of claim 1, wherein each of the one or more RDE unit is powered by its associated PV reference device, using energy harvested from the associated PV reference device between measurements.

9. The system of claim 1, wherein the portable calibrator unit comprises:
one or more portable enclosures;
terminals for connection each of the one or more RDE units associated PV reference device or each of the one or more RDE units;
adjustable current and voltage sources allowing both sourcing power to and sinking power from each of the one or more RDE units associated PV reference device or each of the one or more RDE units;
precision current and voltage measurement circuits to measure the current and voltage of each of the one or more RDE units associated PV reference device or each of the one or more RDE units;
a temperature measurement input to measure the temperature of each of the one or more RDE units associated PV reference device via a temperature sensor affixed to the PV reference device;
a PV reference cell unit for measuring irradiance; and
an integral or separate operator interface.

10. The system of claim 9, wherein the calibrator unit calibrates each of the one or more RDE units by:
sourcing one or more of current and voltage to each of the one or more RDE;
measuring said one or more of current and voltage using one or more of precision current and voltage measurement circuits of the calibrator unit;
comparing said one or more of said current and voltage measurements with results measured by each of the one or more RDE;
calculating calibration constants; and
communicating said calibration constants to each of the one or more RDE for data storage.

11. The system of claim 9, wherein the calibrator unit calibrates each of the one or more RDE units associated PV reference device by:
measuring a short-circuit current or a complete I-V curve of each of the one or more RDE units associated PV reference device;
measuring the temperature of each of the one or more RDE units associated he PV reference device;
measuring irradiance via each of the one or more RDE units associated PV reference cell; and
analyzing measured irradiance to determine calibration data of each of the one or more RDE units associated PV reference device.

12. The system of claim 11, wherein the calibrator unit automatically transfers calibration data for each of the one or more RDE units associated PV reference device to associated each of the one or more RDE units associated RDE.

13. The system of claim 9, wherein the reference cell unit may be removed from the calibrator unit and mounted in a separate position wherein the reference cell unit is coplanar with each of the one or more RDE units associated PV reference device.

14. The system of claim 9, wherein the calibrator unit includes an adjustable mechanism for mounting the reference cell unit coplanar with each of the one or more RDE units associated PV reference device, said mechanism being integral to the calibrator unit.

15. The system of claim 9, wherein the reference cell unit contains sensors for measuring the reference cell unit's angular orientation.

16. The system of claim 15, wherein the calibrator unit uses measurements of the reference cell unit angular orientation to notify an operator that the reference cell unit is acceptably oriented.

17. The system of claim 15, wherein the calibrator unit uses measurements of the reference cell unit angular orientation to calculate an adjustment to the reference cell unit irradiance measurements accounting for the difference in angular orientation of the reference cell unit and each of the one or more RDE units associated PV reference device.

18. The system of claim 9, wherein the calibrator unit permits measurements of PV reference devices over multiple operating conditions of temperature and irradiance and determines calibration data which best fit the results from the multiple operating conditions or which are based on interpolation between said results from the multiple operating conditions.

19. The system of claim 9, wherein the calibrator unit contains a global positioning system, allowing the location of the calibrator unit to be determined, and wherein location data are used to facilitate retrieval of site-specific configuration data or to enable calculation of expected solar angles of incidence.

20. The system of claim 9, wherein data recorded by the calibrator unit are uploaded to a remote computer and wherein the analysis of calibration data is performed on the remote computer.

21. The system of claim 1, wherein each of the one or more RDE units associated PV reference device is allowed to stabilize in a field for an extended time period and the calibrator unit is used to determine when stabilization is completed.

22. A system for field measurement and calibration of photovoltaic (PV) reference devices, wherein said PV reference devices are PV cells or PV modules, comprising:
one or more outdoor-mounted reference device electronics (RDE) units, each of which performs measurements on an associated PV reference device;
a portable calibrator unit, which calibrates each of the one or more RDE units and its associated PV reference devices;
a weather-resistant mounting enclosure;
terminals for connection of an associated PV reference device, the associated PV reverence device being either a PV cell or PV module;
a current measurement circuit to measure the current of the associated PV reference device;
control and communications circuitry; and
non-volatile memory which stores:
calibration data for the RDE unit;
calibration data for its associated PV reference device; and
measurement data;
wherein each of the one or more RDE contains dedicated calibration terminals to facilitate connection of the calibrator unit without disconnection of its associated PV reference device, and wherein each of the one or more RDE contains relays or other switching elements allowing the dedicated calibration terminals to be connected to the internal measurement circuitry of each of the one or more RDE
wherein each of the one or more RDE unit comprises:
a weather-resistant mounting enclosure;
terminals for connection of its associated PV reference device, its associated PV reverence device being either a PV cell or PV module;
a current measurement circuit to measure the current of its associated PV reference device;
control and communications circuitry; and
non-volatile memory which stores:
a first calibration data for each of the one or more RDE unit;

a second calibration data for its associated PV reference device; and measurement data.

23. The system of claim 22, wherein each of the one or more RDE measures the short-circuit current and temperature of its associated PV reference device and calculates irradiance from the short-circuit current and temperature measured values and calibrated against at least one of: the first calibration data, and the second calibration data.

24. The system of claim 22, wherein each of the one or more RDE contains a switching element allowing its associated PV reference device to be maintained in either a short-circuit or open-circuit condition between measurements.

25. The system of claim 22, wherein each of the one or more RDE contains a transient or adjustable load and a voltage measurement circuit to measure the voltage of its associated PV reference device, which together with the current measurement circuit permit measurement of a current versus voltage relationship ("I-V curve") of its associated PV reference device.

26. The system of claim 25, wherein the I-V curve is used to detect degradation or soiling of each of the one more RDE units associated PV reference device.

27. The system of claim 22, wherein each of the one or more RDE contains a biasing power source with adjustable voltage in series with the current measurement circuit.

28. The system of claim 27, wherein the biasing power source may be automatically adjusted via a feedback mechanism to maintain the voltage across each of the one or more RDE units associated PV reference device near zero volts, constituting an ideal short-circuit condition.

29. The system of claim 24, wherein each of the one or more RDE further comprises a voltage measurement circuit to measure the voltage of its associated PV reference device and each of the one or more associated RDE measures the temperature of its associated PV reference device by measuring its associated PV reference device's voltage in the open-circuit condition.

30. The system of claim 22, wherein each of the one or more RDE unit is powered by its associated PV reference device, using energy harvested from its PV reference device between measurements.

31. The system of claim 22, wherein the portable calibrator unit comprises:
one or more portable enclosures;
terminals for connection to each of the one or more RDE units associated PV reference device or each of the one or more RDE;
adjustable current and voltage sources allowing both sourcing power to and sinking power from each of each of the one or more RDE units associated PV reference device or each of the one or more RDE;
precision current and voltage measurement circuits to measure the current and voltage of the one or more RDE units associated PV reference device or each of the one or more RDE;
a temperature measurement input to measure the temperature of each of the one or more RDE units associated PV reference device via a temperature sensor affixed to each of the one or more RDE units associated PV reference device;
a PV reference cell unit for measuring irradiance; and
an integral or separate operator interface.

32. The system of claim 31, wherein the calibrator unit calibrates each of one or more RDE by:
sourcing one or more of current and voltage to each of the one or more RDE;
measuring said one or more of current and/voltage using one or more of precision current and voltage measurement circuits of the calibrator unit;
comparing said one or more of said current and voltage measurements with results measured by each of the one or more RDE;
calculating calibration constants; and
communicating said calibration constants to each of the one or more RDE for data storage.

33. The system of claim 31, wherein the calibrator unit calibrates each of the one or more RDE units associated PV reference device by:
measuring a short-circuit current or a complete I-V curve of each of the one or more RDE units associated PV reference device;
measuring the temperature of the each of the one or more RDE units associated PV reference device;
measuring irradiance via each of the one or more RDE units associated PV reference cell; and
analyzing measured irradiance to determine calibration data of each of the one or more RDE units associated PV reference device.

34. The system of claim 33, wherein the calibrator unit automatically transfers calibration data for each of the one or more RDE units associated PV reference device to each of the one or more RDE.

35. The system of claim 31, wherein the reference cell unit may be removed from the calibrator unit and mounted in a separate position wherein the reference cell unit is coplanar with each of the one or more RDE units associated PV reference device.

36. The system of claim 31, wherein the calibrator unit includes an adjustable mechanism for mounting the reference cell unit coplanar with each of the one or more RDE units associated PV reference device, said mechanism being integral to the calibrator unit.

37. The system of claim 31, wherein the reference cell unit contains sensors for measuring the reference cell unit's angular orientation.

38. The system of claim 37, wherein the calibrator unit uses measurements of the reference cell unit angular orientation to notify an operator that the reference cell unit is acceptably oriented.

39. The system of claim 37, wherein the calibrator unit uses measurements of the reference cell unit angular orientation to calculate an adjustment to the reference cell unit irradiance measurements accounting for the difference in angular orientation of the reference cell unit and the PV reference device.

40. The system of claim 31, wherein the calibrator unit permits measurements each of the one or more RDE units associated PV reference devices over multiple operating conditions of temperature and irradiance and determines calibration data which best fit the results from the multiple operating conditions or which are based on interpolation between said results from the multiple operating conditions.

41. The system of claim 31, wherein each of the one or more RDE units associated PV reference device is allowed to stabilize in the field for an extended time period and the calibrator unit is used to determine when stabilization is complete.

42. The system of claim 31, wherein the calibrator unit contains a global positioning system, allowing the location of the calibrator unit to be determined, and wherein location data are used to facilitate retrieval of site-specific configuration data or to enable calculation of expected solar angles of incidence.

43. The system of claim 31, wherein data recorded by the calibrator unit are uploaded to a remote computer and wherein the analysis of calibration data is performed on the remote computer.

44. A system for field measurement and calibration of photovoltaic (PV) reference devices, wherein said PV reference devices are PV cells or PV modules, comprising:
one or more outdoor-mounted reference device electronics (RDE) units, each of which performs measurements on an associated PV reference device;
a portable calibrator unit, which calibrates each of the one or more RDE units and each of the one or more RDE units associated PV reference devices;
wherein each of the one or more RDE unit comprises:
a weather-resistant mounting enclosure;
terminals for connection of an each of the one or more RDE units associated PV reference device, the associated PV reverence device being either a PV cell or PV module;
a current measurement circuit to measure the current of the associated PV reference device;
control and communications circuitry; and
non-volatile memory which stores:
a first calibration data for each of the one or more RDE unit;
a second calibration data for its associated PV reference device; and
measurement data
wherein each of the one or more RDE contains a switching element allowing each of the one or more RDE units associated PV reference device to be maintained in either a short-circuit or open-circuit condition between measurements;
wherein each of the one or more RDE units further comprises a voltage measurement circuit to measure the voltage of each of the one or more RDE units associated PV reference device and each of the one or more RDE units measures the temperature of each of the one or more RDE units associated PV reference device by measuring each of the one or more RDE units associated PV reference device's voltage in the open-circuit condition.

45. The system of claim 44, wherein each of the one or more RDE measures the short-circuit current and temperature of each of the one or more RDE units associated PV reference device and calculates irradiance from the short-circuit current and temperature measured values using the stored calibration data.

46. The system of claim 44, wherein each of the one or more RDE units contains a transient or adjustable load and a voltage measurement circuit to measure the voltage of each of the one or more RDE units associated PV reference device, which together with the current measurement circuit permit measurement of a current versus voltage relationship ("I-V curve") of each of the one or more RDE units associated PV reference device.

47. The system of claim 46, wherein the I-V curve is used to detect degradation or soiling of each of the one or more RDE units associated PV reference device.

48. The system of claim 44, wherein each of the one or more RDE units contains a biasing power source with adjustable voltage in series with the current measurement circuit.

49. The system of claim 48, wherein the biasing power source may be automatically adjusted via a feedback mechanism to maintain the voltage across each of the one or more RDE units associated PV reference device near zero volts, constituting an ideal short-circuit condition.

50. The system of claim 44, wherein each of the one or more RDE contains dedicated calibration terminals to facilitate connection of the calibrator unit without disconnection of each of the one or more RDE units associated PV reference device, and wherein each of the one or more RDE contains relays or other switching elements allowing the dedicated calibration terminals to be connected to the internal measurement circuitry of each of the one or more RDE.

51. The system of claim 44, wherein each of the one or more RDE unit is powered by each of the one or more RDE units associated PV reference device, using energy harvested from each of the one or more RDE units associated PV reference device between measurements.

52. The system of claim 44, wherein the portable calibrator unit comprises:
one or more portable enclosures;
terminals for connection to each of the one or more RDE units associated PV reference device or each of the one or more RDE;
adjustable current and voltage sources allowing both sourcing power to and sinking power from each of the one or more RDE units associated PV reference device or each of the one or more RDE units;
precision current and voltage measurement circuits to measure the current and voltage of each of the one or more RDE units associated PV reference device or each of the one or more RDE;
a temperature measurement input to measure the temperature of each of the one or more RDE units associated PV reference device via a temperature sensor affixed to each of the one or more RDE units associated PV reference device;
a PV reference cell unit for measuring irradiance; and
an integral or separate operator interface.

53. The system of claim 52, wherein the calibrator unit calibrates each of the one or more RDE units by:
sourcing one or more of current and voltage to each of the one or more RDE;
measuring said one or more of current and/voltage using one or more of precision current and voltage measurement circuits of the calibrator unit;
comparing said one or more of said current and voltage measurements with results measured by each of the one or more RDE units;
calculating calibration constants; and
communicating said calibration constants to each of the one or more RDE units for data storage.

54. The system of claim 52, wherein the calibrator unit calibrates each of the one or more RDE units associated PV reference device associated with each of the one or more RDE units by:
measuring a short-circuit current or a complete I-V curve of each of the one or more RDE units associated PV reference device;
measuring the temperature of each of the one or more RDE units associated PV reference device;
measuring irradiance via said PV reference cell; and
analyzing measured irradiance to determine calibration data of each of the one or more RDE units associated PV reference device.

55. The system of claim 54, wherein the calibrator unit automatically transfers calibration data for each of the one or more RDE units associated PV reference device to the each of the one or more RDE.

56. The system of claim 52, wherein the reference cell unit may be removed from the calibrator unit and mounted in a separate position wherein the reference cell unit is coplanar with each of the one or more RDE units associated PV reference device.

57. The system of claim 52, wherein the calibrator unit includes an adjustable mechanism for mounting the reference cell unit coplanar with each of the one or more RDE units associated PV reference device, said mechanism being integral to the calibrator unit.

58. The system of claim 52, wherein the reference cell unit contains sensors for measuring the reference cell unit's angular orientation.

59. The system of claim 58, wherein the calibrator unit uses measurements of the reference cell unit angular orientation to notify an operator that the reference cell unit is acceptably oriented.

60. The system of claim 58, wherein the calibrator unit uses measurements of the reference cell unit angular orientation to calculate an adjustment to the reference cell unit irradiance measurements accounting for the difference in angular orientation of the reference cell unit and each of the one or more RDE units associated PV reference device.

61. The system of claim 52, wherein the calibrator unit permits measurements of PV reference devices over multiple operating conditions of temperature and irradiance and determines calibration data which best fit the results from the multiple operating conditions or which are based on interpolation between said results from the multiple operating conditions.

62. The system of claim 52, wherein each of the one or more RDE units associated PV reference device is allowed to stabilize in the field for an extended time period and the calibrator unit is used to determine when stabilization is complete.

63. The system of claim 52, wherein the calibrator unit contains a global positioning system, allowing the location of the calibrator unit to be determined, and wherein location data are used to facilitate retrieval of site-specific configuration data or to enable calculation of expected solar angles of incidence.

64. The system of claim 52, wherein data recorded by the calibrator unit are uploaded to a remote computer and wherein the analysis of calibration data is performed on the remote computer.

65. A system for field measurement and calibration of photovoltaic (PV) reference devices, wherein said PV reference devices are PV cells or PV modules, comprising:
   one or more outdoor-mounted reference device electronics (RDE) units, each of which performs measurements on an associated PV reference device;
   a portable calibrator unit, which calibrates each of the one or more RDE units and each of the one or more associated PV reference devices
   wherein the portable calibrator unit comprises:
      one or more portable enclosures;
      terminals for connection to the PV reference device or the RDE;
      adjustable current and voltage sources allowing both sourcing power to and sinking power from the PV reference device or RDE;
      precision current and voltage measurement circuits to measure the current and voltage of the PV reference device or RDE;
      a temperature measurement input to measure the temperature of the PV reference device via a temperature sensor affixed to the PV reference device;
      a PV reference cell unit for measuring irradiance; and
      an integral or separate operator interface.

66. The system of claim 65, wherein each of the one or more RDE unit comprises:
   a weather-resistant mounting enclosure;
   terminals for connection of an associated PV reference device, the associated PV reverence device being either a PV cell or PV module;
   a current measurement circuit to measure the current of the associated PV reference device;
   control and communications circuitry; and
   non-volatile memory which stores:
      a first calibration data for each of the one or more RDE unit;
      a second calibration data for its associated PV reference device; and
      measurement data.

67. The system of claim 66, wherein each of the one or more RDE measures the short-circuit current and temperature of each of the one or more RDE associated PV reference device and calculates irradiance from the short-circuit current and temperature measured values using the stored calibration data.

68. The system of claim 66, wherein each of the one or more RDE contains a switching element allowing each of the one or more RDE units associated PV reference device to be maintained in either a short-circuit or open-circuit condition between measurements.

69. The system of claim 66, wherein each of the one or more RDE contains a transient or adjustable load and a voltage measurement circuit to measure the voltage of each of the one or more RDE units associated PV reference device, which together with the current measurement circuit permit measurement of a current versus voltage relationship ("I-V curve") of the PV reference device.

70. The system of claim 69, wherein the I-V curve is used to detect degradation or soiling of each of the one or more RDE units associated PV reference device.

71. The system of claim 66, wherein each of the one or more RDE contains a biasing power source with adjustable voltage in series with the current measurement circuit.

72. The system of claim 71, wherein the biasing power source may be automatically adjusted via a feedback mechanism to maintain the voltage across each of the one or more RDE units associated PV reference device near zero volts, constituting an ideal short-circuit condition.

73. The system of claim 66, wherein each of the one or more RDE contains dedicated calibration terminals to facilitate connection of the calibrator unit without disconnection of each of the one or more RDE units associated PV reference device, and wherein each of the one or more RDE contains relays or other switching elements allowing the dedicated calibration terminals to be connected to the internal measurement circuitry of each of the one or more RDE.

74. The system of claim 68, wherein each of the one or more RDE further comprises a voltage measurement circuit to measure the voltage of each of the one or more RDE units associated PV reference device and each of the one or more RDE measures the temperature of each of the one or more RDE units associated PV reference device by measuring the associated PV reference device's voltage in the open-circuit condition.

75. The system of claim 66, wherein each of the one or more RDE unit is powered by the associated PV reference device, using energy harvested from the PV reference device between measurements.

76. The system of claim 65, wherein the calibrator unit calibrates each of the one or more RDE by:

sourcing one or more of current and voltage to each of the one or more RDE;

measuring said one or more of current and/voltage using one or more of precision current and voltage measurement circuits of the calibrator unit;

comparing said one or more of said current and voltage measurements with results measured by each of the one or more RDE;

calculating calibration constants; and communicating said calibration constants to the RDE units for data storage.

77. The system of claim 76, wherein the calibrator unit calibrates each of the one or more RDE units associated PV reference device by:

measuring a short-circuit current or a complete I-V curve of each of the one or more RDE units associated PV reference device;

measuring the temperature of each of the one or more RDE units associated PV reference device;

measuring irradiance via said PV reference cell; and analyzing measured irradiance to determine calibration data of each of the one or more RDE units associated PV reference device.

78. The system of claim 76, wherein the calibrator unit automatically transfers calibration data for each of the one or more RDE units associated PV reference device to each of the one or more RDE.

79. The system of claim 65, wherein the reference cell unit may be removed from the calibrator unit and mounted in a separate position wherein the reference cell unit is coplanar with each of the one or more RDE units associated PV reference device.

80. The system of claim 65, wherein the calibrator unit includes an adjustable mechanism for mounting the reference cell unit coplanar with each of the one or more RDE units associated PV reference device, said mechanism being integral to the calibrator unit.

81. The system of claim 65, wherein the reference cell unit contains sensors for measuring the reference cell unit's angular orientation.

82. The system of claim 81, wherein the calibrator unit uses measurements of the reference cell unit angular orientation to notify an operator that the reference cell unit is acceptably oriented.

83. The system of claim 81, wherein the calibrator unit uses measurements of the reference cell unit angular orientation to calculate an adjustment to the reference cell unit irradiance measurements accounting for the difference in angular orientation of the reference cell unit and each of the one or more RDE units associated PV reference device.

84. The system of claim 65, wherein the calibrator unit permits measurements each of the one or more RDE units associated PV reference devices over multiple operating conditions of temperature and irradiance and determines calibration data which best fit the results from the multiple operating conditions or which are based on interpolation between said results from the multiple operating conditions.

85. The system of claim 65, wherein each of the one or more RDE units associated PV reference device is allowed to stabilize in the field for an extended time period and the calibrator unit is used to determine when stabilization is complete.

86. The system of claim 65, wherein the calibrator unit contains a global positioning system, allowing the location of the calibrator unit to be determined, and wherein location data are used to facilitate retrieval of site-specific configuration data or to enable calculation of expected solar angles of incidence.

87. The system of claim 65, wherein data recorded by the calibrator unit are uploaded to a remote computer and wherein the analysis of calibration data is performed on the remote computer.

88. An apparatus for performing measurements on a photovoltaic (PV) reference device, which may be either a PV cell or a module, to determine irradiance, comprising:

a weather-resistant mounting enclosure;

terminals to connect an associated PV reference device, each of the one or more RDE associated PV reverence device being either a PV cell or PV module;

a current measurement circuit to measure the current of each of the one or more RDE associated PV reference device;

control and communications circuitry;

non-volatile memory which stores:
first calibration data for the apparatus;
second calibration data for the apparatus's associated PV reference device; and
measurement data; and wherein the apparatus measures a short-circuit current and a temperature of the associated PV reference device and calculates irradiance from the short-circuit current and the temperature measured values using stored calibration data;

a biasing power source with adjustable voltage in series with the current measurement circuit;

wherein the biasing power source may be automatically adjusted via a feedback mechanism to maintain a voltage across the PV reference device near zero volts, constituting an ideal short-circuit condition.

89. The apparatus of claim 88, further comprising a switching element allowing the PV reference device to be maintained in either a short-circuit or an open-circuit condition between measurements.

90. The apparatus of claim 88, further comprising a transient or adjustable load and a voltage measurement circuit to measure the voltage of the associated PV reference device, which together with the current measurement circuit permit measurement of a current versus voltage relationship ("I-V curve") of the PV reference device.

91. The apparatus of claim 90, wherein the I-V curve is used to detect degradation or soiling of the PV reference device.

92. The apparatus of claim 89, further comprising a voltage measurement circuit to measure the voltage of the associated PV reference device and wherein the apparatus measures the temperature of the associated PV reference device by measuring the associated PV reference device's voltage in the open-circuit condition.

93. The apparatus of claim 88, wherein the apparatus is powered by the apparatus's associated PV reference device, using energy harvested from the PV reference device between measurements.

94. An apparatus for performing measurements on a photovoltaic (PV) reference device, which may be either a PV cell or a module, to determine irradiance, comprising:

a weather-resistant mounting enclosure;

terminals to connect an associated PV reference device, the PV reverence device being either a PV cell or PV module;

a current measurement circuit to measure the current of the associated PV reference device;

control and communications circuitry;

non-volatile memory which stores:
calibration data for the apparatus;
calibration data for the apparatus's associated PV reference device; and
measurement data; and
wherein the apparatus measures a short-circuit current and a temperature of the associated PV reference device and calculates irradiance from the short-circuit current and the temperature measured values using stored calibration data;
a switching element allowing the PV reference device to be maintained in either a short-circuit or an open-circuit condition between measurements; and
a voltage measurement circuit to measure the voltage of the associated PV reference device and wherein the apparatus measures the temperature of the associated PV reference device by measuring the associated PV reference device's voltage in the open-circuit condition.

95. The apparatus of claim 94, further comprising a transient or adjustable load and a voltage measurement circuit to measure the voltage of the associated PV reference device, which together with the current measurement circuit permit measurement of a current versus voltage relationship ("I-V curve") of the PV reference device.

96. The apparatus of claim 95, wherein the I-V curve is used to detect degradation or soiling of the PV reference device.

97. The apparatus of claim 94, further comprising a biasing power source with adjustable voltage in series with the current measurement circuit.

98. The apparatus of claim 97, wherein the biasing power source may be automatically adjusted via a feedback mechanism to maintain a voltage across the PV reference device near zero volts, constituting an ideal short-circuit condition.

99. The apparatus of claim 94, wherein the apparatus is powered by the apparatus's associated PV reference device, using energy harvested from the PV reference device between measurements.

100. An apparatus for calibrating photovoltaic (PV) reference devices, which may be either PV cells or modules, comprising:
one or more portable enclosures;
terminals to connect a PV reference device, the PV reverence device being either PV cells or modules;
circuitry for measuring a short-circuit current or a current versus voltage relationship ("I-V curve") of the PV reference device;
a temperature measurement input to measure the temperature of the PV reference device via a temperature sensor affixed to the PV reference device;
a PV reference cell unit for measuring irradiance; and
an integral or separate operator interface;
wherein the reference cell unit contains sensors for measuring the reference cell unit's angular orientation;
wherein the apparatus uses measurements of the reference cell unit's angular orientation to calculate an adjustment to the reference cell unit irradiance measurements accounting for the difference in angular orientation of the reference cell unit and the PV reference device.

101. The apparatus of claim 100, wherein the reference cell unit may be removed from the apparatus and mounted in a separate position wherein the reference cell unit is coplanar with the PV reference device.

102. The apparatus of claim 100, wherein the apparatus further comprises an adjustable mechanism for mounting the reference cell unit coplanar with the PV reference device, said mechanism being integral to the apparatus.

103. The apparatus of claim 100, wherein the apparatus uses measurements of the reference cell unit's angular orientation to notify an operator that the reference cell unit is acceptably oriented.

104. The apparatus of claim 100, wherein the apparatus permits measurements of PV reference devices over multiple operating conditions of temperature and irradiance and determines calibration data which best fit the results from the multiple operating conditions or which are based on interpolation between said results from the multiple operating conditions.

105. The apparatus of claim 100, wherein the PV reference device is allowed to stabilize in the field for an extended time period and the apparatus is used to determine when stabilization is complete.

106. The apparatus of claim 100, wherein the apparatus contains a global positioning system, allowing the location of the apparatus to be determined, and wherein location data are used to facilitate retrieval of site-specific configuration data or to enable calculation of expected solar angles of incidence.

107. The apparatus of claim 100, wherein data recorded by the apparatus are uploaded to a remote computer and wherein the analysis of calibration data is performed on the remote computer.

108. An apparatus for calibrating photovoltaic (PV) reference devices, which may be either PV cells or modules, comprising:
one or more portable enclosures;
terminals to connect a PV reference device, the PV reverence device being either PV cells or modules;
circuitry for measuring a short-circuit current or a current versus voltage relationship ("I-V curve") of the PV reference device;
a temperature measurement input to measure the temperature of the PV reference device via a temperature sensor affixed to the PV reference device;
a PV reference cell unit for measuring irradiance; and
an integral or separate operator interface;
wherein the apparatus permits measurements of PV reference devices over multiple operating conditions of temperature and irradiance and determines calibration data which best fit the results from the multiple operating conditions or which are based on interpolation between said results from the multiple operating conditions.

109. The apparatus of claim 108, wherein the reference cell unit may be removed from the apparatus and mounted in a separate position wherein the reference cell unit is coplanar with the PV reference device.

110. The apparatus of claim 108, wherein the apparatus further comprises an adjustable mechanism for mounting the reference cell unit coplanar with the PV reference device, said mechanism being integral to the apparatus.

111. The apparatus of claim 108, wherein the apparatus uses measurements of the reference cell unit's angular orientation to notify an operator that the reference cell unit is acceptably oriented.

112. The apparatus of claim 108, wherein the apparatus uses measurements of the reference cell unit's angular orientation to calculate an adjustment to the reference cell unit irradiance measurements accounting for the difference in angular orientation of the reference cell unit and the PV reference device.

113. The apparatus of claim 108, wherein the PV reference device is allowed to stabilize in the field for an extended time period and the apparatus is used to determine when stabilization is complete.

114. The apparatus of claim 108, wherein the apparatus contains a global positioning system, allowing the location of the apparatus to be determined, and wherein location data are used to facilitate retrieval of site-specific configuration data or to enable calculation of expected solar angles of incidence.

115. The apparatus of claim 108, wherein data recorded by the apparatus are uploaded to a remote computer and wherein the analysis of calibration data is performed on the remote computer.

\* \* \* \* \*